Sept. 6, 1955  A. PERRAULT  2,717,001
VALVE SEAT
Filed July 15, 1950
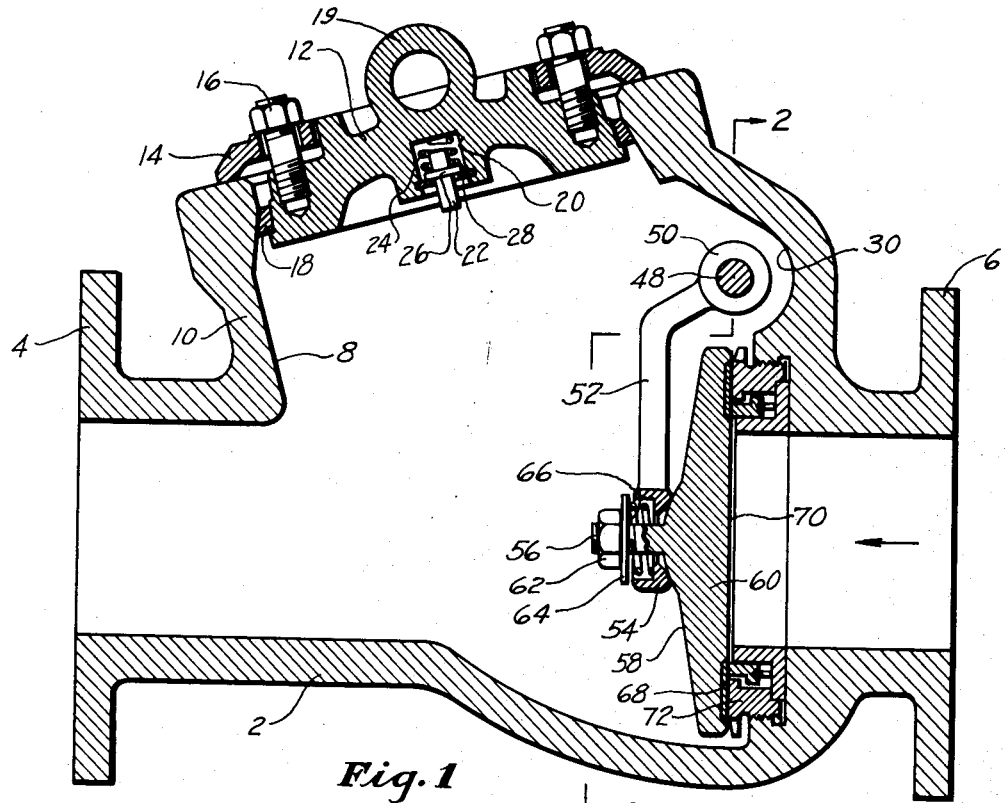
Fig. 1
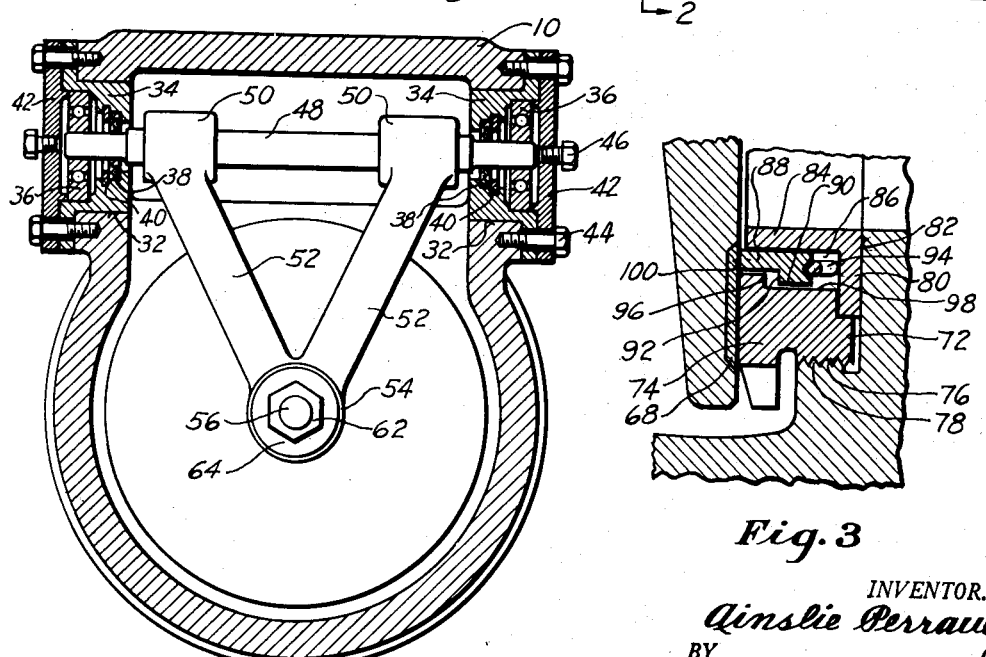
Fig. 2
Fig. 3
INVENTOR.
Ainslie Perrault
BY
C. M. McKnight
ATTORNEY

United States Patent Office 2,717,001
Patented Sept. 6, 1955

2,717,001

VALVE SEAT

Ainslie Perrault, Tulsa, Okla.

Application July 15, 1950, Serial No. 174,051

1 Claim. (Cl. 137—514)

This invention relates to valves and more particularly, but not by way of limitation, to safety valves. This is a continuation-in-part of applicant's copending application, Serial No. 10,685, filed February 25, 1948, and entitled Safety Valve, and now Patent No. 2,578,590.

The present invention is generally concerned with the valve seat of a safety valve, and more particularly with the cushioning of the valve disk during the final closing movement thereof, as well as the cleaning of the seating ring carried by the disk.

An important object of this invention is to provide a valve seat for safety valves adapted to cushion the stopping of the valve disk in its closing movement.

Another object of this invention is to provide a valve seat for safety valves providing a uniform cushioning of the valve disk over the entire seating area of the disk.

A further object of this invention is to provide a valve seat for safety valve whereby fluid discharged from the hydraulic cushioning chamber of the seat cleans the seating ring carried by the valve disk.

A still further object of this invention is to provide an efficient valve seat for safety valves having a long service life and capable of being economically manufactured.

Other objects and advantages of the invention will be evident from the following detailed description, read in conjunction with the accompanying drawings, which illustrate my invention.

In the drawings:

Figure 1 is a longitudinal sectional view of the safety valve having a novel valve seat therein.

Figure 2 is a sectional view taken essentially on line 2—2 of Figure 1.

Figure 3 is a fragmentary sectional view of the valve seat.

Referring to the drawings in detail, reference character 2 designates the valve body having flanges 4 and 6 formed on the opposite ends thereof for connection with a flow line (not shown). The body 2 is also provided with an opening 8 in the upper portion thereof surrounded by an upstanding flange 10. The opening 8 is normally closed by a bonnet 12 co-acting with the inner wall of the flange 10. The bonnet 12 is retained in the desired position by a spider or clamp member 14 secured to the bonnet by a plurality of bolts 16 and contacting the outer end of the flange 10. When the bolts 16 are tightened, the bonnet 12 is obviously moved outwardly to press a suitable sealing ring 18, disposed on the outer periphery of the bonnet 12, into sealing relation with the inner tapered wall of the flange 10, thereby sealing the bonnet 12 in the flange 10 and efficiently closing the opening 8. The bonnet 12 is provided with the usual lifting eye 19.

The bonnet 12 is also provided with a bore 20 in the central portion thereof communicating with the interior of the body 2 having a buffer pin 22 reciprocally disposed therein. A helical spring 24 is anchored in the bore 20 in contact with a circumferential flange 26 provided on the central portion of the pin 22 for resisting upward movement of the pin. The pin 22 is retained in the bore 20 against the action of the spring 24 by a suitable retaining ring 28 provided in the lower end of the bore 20.

The flange 10 is provided with a cut away portion 30 in line with a pair of transverse apertures 32 (Fig. 2). Each aperture 32 is provided with a sleeve 34 containing a suitable roller bearing unit 36. The sleeve 34 also contains a suitable grease seal 38 secured in position by a retaining ring 40. Each sleeve 34 is retained in its respective aperture 32 by a cap or cover 42 having a plurality of bolts 44 threaded into the flange 10. The cover 42 is also provided with a conventional lubrication filling 46 for supplying lubricant to the bearing 36.

The bearing units 36 support the opposite ends of a rotatable hinge pin 48 having a pair of bearing members 50 secured thereon in spaced relation by set screws or the like (not shown). The bearing members 50 are provided with obliquely disposed arms 52 connected at their lower ends to an apertured hub member 54. The hub 54 is adapted to loosely receive a stud 56 secured on the rear face 58 of a circular shaped valve disk or clapper 60. The stud 56 has a nut 62 threaded on the outer end thereof having a suitable flange 64 on the side adjacent the hub 54. A helical spring 66, anchored in the hub 54, has one end contacting the flange 64 to continually resist movement of the hub 54 toward the flange 64. An annular seating ring 68 is carried in the front face 70 of the valve disk 60 adapted to cooperate with a novel valve seat 72 secured in the valve body 2 when the disk is in a closed position as shown in Figure 1.

As clearly shown in Figure 3, the valve seat 72 is composed of an annular ring member 74 having external threads 76 cooperating with threads 78 in the valve body 2. The ring 74 retains another ring member 80, essentially L-shaped in cross-section, against a circumferential shoulder 82 provided in the valve body 2. The ring member 80 has a rearwardly extending portion 84 disposed in inwardly spaced relation to the ring member 74 to provide an annular chamber 86. A landing ring 88, having an enlarged portion 90 forming a circumferential shoulder 92, is loosely disposed in the chamber 86. A corrugated circular spring 94 is disposed in the forward portion of the chamber 86 adapted to cooperate with the ring member 80 to continually force the landing ring 88 rearwardly out of the chamber 86. The landing ring 88 is, however, prevented from being extruded from the chamber 86 by a shoulder 96, provided on the inner periphery 98 of the ring member 74, contacting the shoulder 92. When the valve plate 60 is in an open position (not shown), the spring 94 will retain the shoulder 92 against the shoulder 96, thereby extending the rear end 100 of the landing ring 88 rearwardly of the ring member 74.

Operation

Assuming the valve is closed as shown in Figure 1 and fluid is supplied to the valve in the direction indicated by the arrow (also shown in Figure 1), the pressure of the fluid acting on the front face 70 of the valve disc 60 will pivot the disk upwardly on the hinge pin 48 to the open position (not shown). In the event the pressure of the fluid is relatively high, thereby swinging the disk 60 upwardly very rapidly, the nut 62 will contact the buffer pin 22 and contract the helical spring 24. The spring 24, through the medium of pin 22, will cushion the stopping of the disc 60 to prevent any possible damage to the disk or the valve body. As long as sufficient pressure is exerted on the front face 70 of the disk 60, the disk will be maintained in an open position (not shown), permitting the fluid to flow through the valve.

When the incoming fluid pressure is released for any reason, such as a break in the flow line (not shown) upstream of the valve, the fluid pressure acting on the rear face 58 of the disk 60 will immediately swing the disk downwardly toward the valve seat 72. As the disk 60 approaches the valve seat 72, the seating ring 68 will contact the rear end 100 of the landing ring 88 and force the landing ring further into the chamber 86 against the action of the spring 94. The fluid previously contained in the forward end of the chamber 86 will be forced rearwardly between the walls of the chamber 86 and the loosely fitting landing ring 88. The fluid so discharged from the chamber 86 will spread over the seating ring 68 and tend to keep the sealing ring free of foreign matter. It will be apparent that the area through which the discharging fluid must pass when escaping from the chamber 86 will be relatively limited, thereby providing a hydraulic shock absorber action for the landing ring 88. This hydraulic shock absorber action, in conjunction with the action of the spring 94, will cushion the stopping of the disk 60 in its closing movement to absorb the shock incident to the closing action.

The corrugated spring 94 will exert a uniform force over the entire circumference of the landing ring 88, thereby maintaining the landing ring in a true vertical disposition for efficiently receiving the sealing ring 68. Furthermore, the uniform force exerted by the spring 94 provides for a uniform cushioning action over the entire seating area of the seating ring 68.

When the disk 60 is in a vertical position as shown in Figure 1, the sealing ring 68 will be in sealing contact with the ring member 74 and the landing ring 88 to preclude a reverse flow of fluid through the valve.

From the foregoing, it is apparent that the present invention provides a novel valve seat which cushions the stopping of the valve disk in its final closing movement. Furthermore, the cushioning action is uniform over the entire seating area of the valve disk, and the seating area of the valve disk is maintained clean of all foreign matter which may tend to decrease the efficiency of the valve. It is also apparent that the present valve seat may be economically manufactured.

Changes may be made in the combination and arrangement of parts as heretofore set forth in the specification and shown in the drawings, it being understood that any modification in the precise embodiment of the invention may be made within the scope of the following claim without departing from the spirit of the invention.

I claim:

In a valve seat for a safety valve having a pivotable disc capable of rapid automatic opening and closing and comprising ring means secured in the valve body and an annular chamber in said ring means, said chamber being closed at its inner end and open at its outer end, and a freely moveable landing ring disposed in said chamber and adapted to extend outwardly through the open end of the chamber beyond the ring means in one position thereof for contact by the valve disc, said chamber being of greater width than the thickness of said landing ring to define with said landing ring a restricted passageway for fluid into and out of the chamber, said fluid being displaced from the chamber when said landing ring is moved therein from said one position, and said displaced fluid moving across the valve disc for cleaning the seating area simultaneous with a hydraulic cushioning action of the landing ring relative to the ring means, and spring means in the chamber constantly urging the ring means into said one position to draw fluid into the chamber through said passageway.

References Cited in the file of this patent

UNITED STATES PATENTS

| 463,175 | St. John | Nov. 17, 1891 |
| 580,294 | Stone | Apr. 6, 1897 |
| 2,027,455 | Seibt | Jan. 14, 1936 |
| 2,078,375 | Eldridge | Apr. 27, 1937 |
| 2,114,934 | Nordstrom | Apr. 19, 1938 |
| 2,280,757 | Smith | Apr. 21, 1942 |

FOREIGN PATENTS

| 356,973 | Great Britain | of 1931 |
| 608,964 | Germany | of 1936 |
| 618,104 | Great Britain | of 1949 |

OTHER REFERENCES

Mechanical Engineers' Handbook by Lionel S. Marks, Fourth Edition, 1941, pages 274–276.